Aug. 16, 1932.  C. E. ROGERS  1,871,860
MACHINE FOR EXTRACTING THE JUICE OF CITROUS FRUITS
Filed Feb. 15, 1929  4 Sheets-Sheet 3

INVENTOR.
CHARLES E. ROGERS
BY
ATTORNEY.

Aug. 16, 1932. C. E. ROGERS 1,871,860
MACHINE FOR EXTRACTING THE JUICE OF CITROUS FRUITS
Filed Feb. 15, 1929 4 Sheets-Sheet 4

INVENTOR.
CHARLES E. ROGERS
BY
ATTORNEY.

Patented Aug. 16, 1932

1,871,860

UNITED STATES PATENT OFFICE

CHARLES E. ROGERS, OF DETROIT, MICHIGAN, ASSIGNOR TO C. E. ROGERS COMPANY, OF DETROIT, MICHIGAN, A CORPORATION OF MICHIGAN

MACHINE FOR EXTRACTING THE JUICE OF CITROUS FRUITS

Application filed February 15, 1929. Serial No. 340,038.

This invention relates to machines for extracting the juice of citrous fruits and the object of the invention is to provide a machine into which citrous fruits may be fed continuously and placed under pressure to extract the juice of the citrous fruit including a small quantity of the essential oils to give a flavor or tang to the juice.

Another object of the invention is to provide a machine having a multiplicity of small presses carried by drums and into which the citrous fruits are fed in succession either whole or in smaller pieces, a cam being provided for operating the small presses and maintaining the fruit under pressure for a sufficient time to extract practically all of the juice therefrom.

A further object of the invention is to provide a means for placing a yielding pressure on the fruit by each press without completely crushing the pulp and skins.

These objects and the several novel features of the invention are hereinafter more fully described and claimed and the preferred form of construction by which these objects are attained is shown in the accompanying drawings in which—

Figure 1:
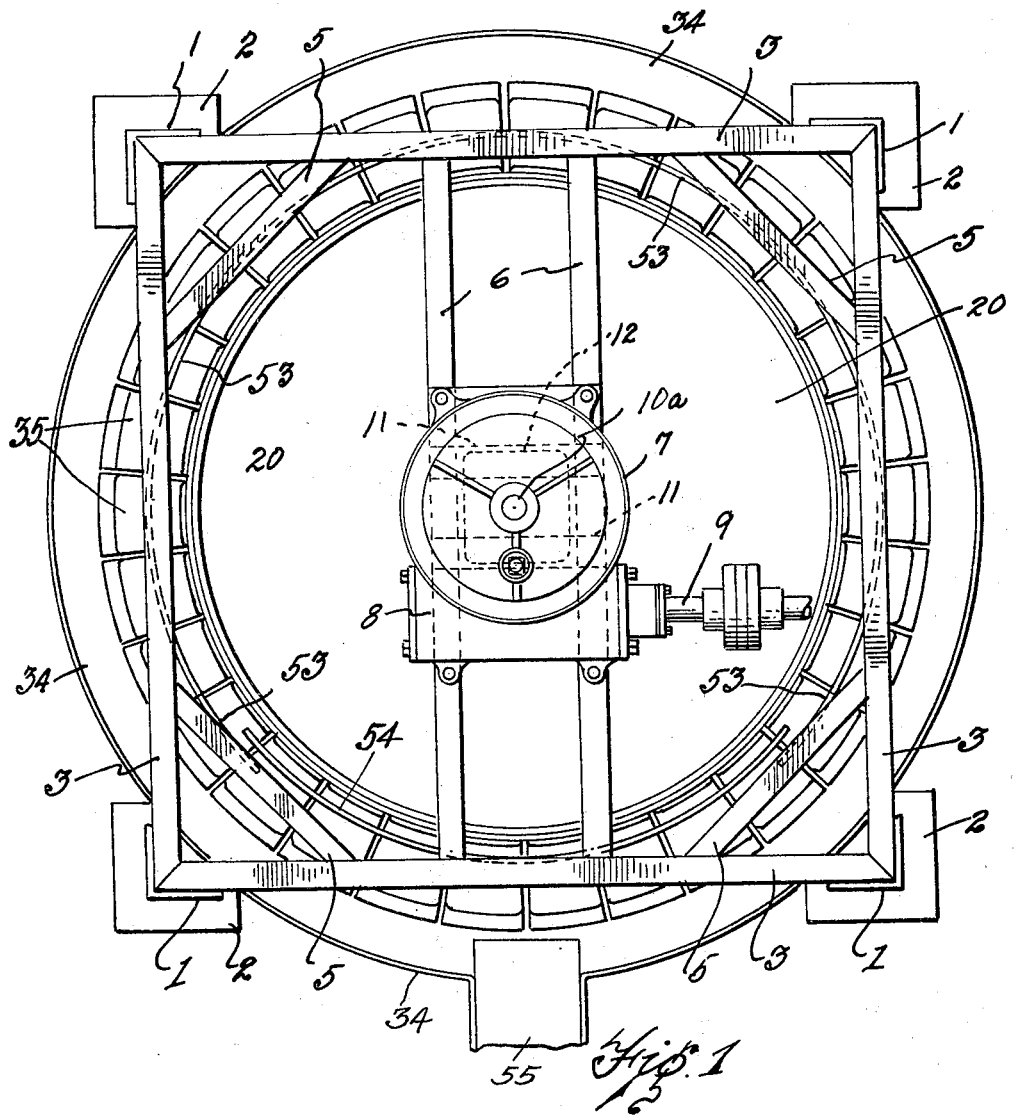
Fig. 1 is a plan view of a machine embodying my invention.
Figure 2:
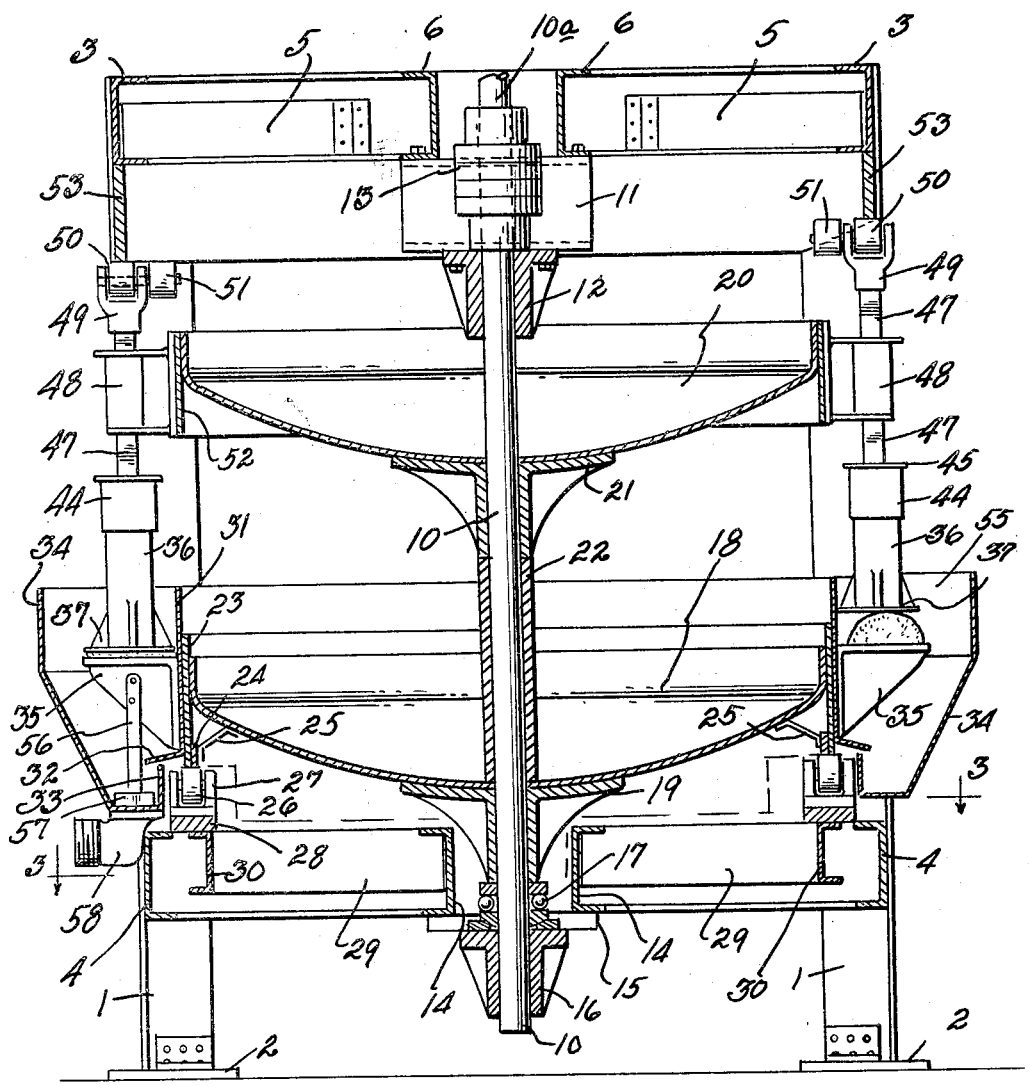
Fig. 2 is a vertical section therethrough.
Figure 3:
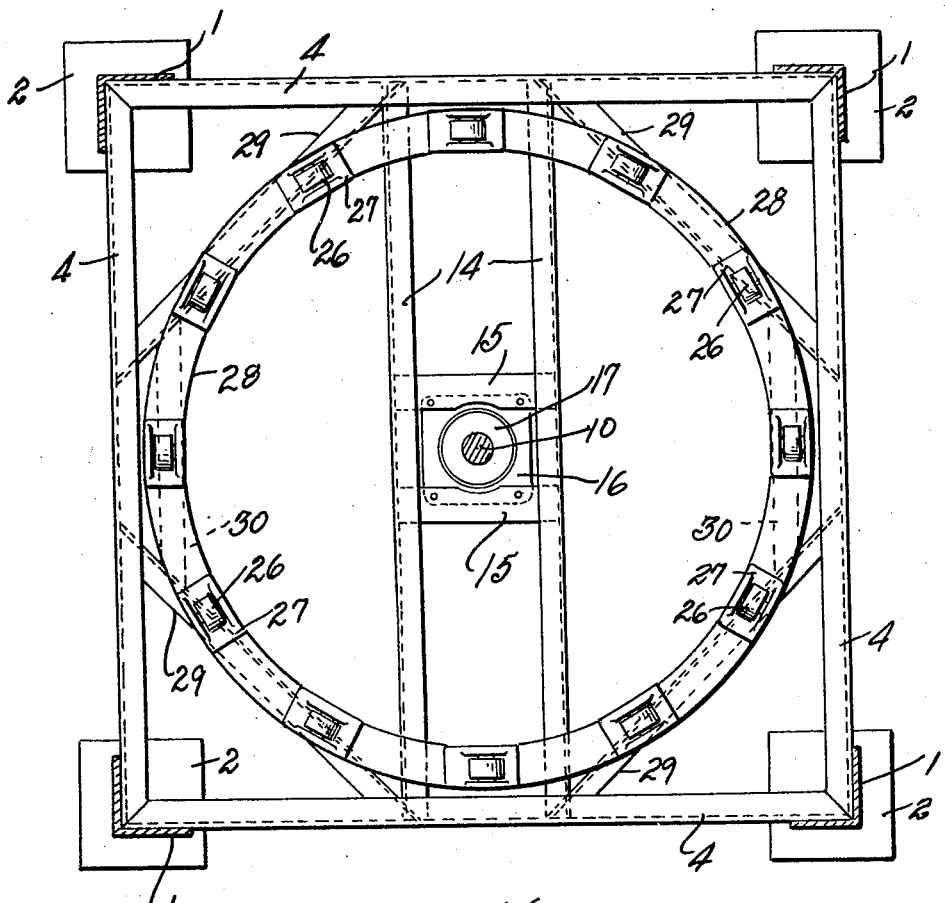
Fig. 3 is a section taken on line 3—3 of Fig. 2.

The device as shown in Figs. 1, 2 and 3 comprises four corner posts or angle iron legs 1 each provided with a foot 2 and these corner posts support a rectangular iron frame 3 at the upper end and a similar rectangular frame 4 adjacent the lower end. The rectangular frame 3, shown in Fig. 1, is provided with corner braces 5 and two parallel frame members 6 are provided across the center thereof. Supported on the frame members 6 is a housing 7 for a worm gear and a housing 8 for a worm meshing therewith. The worm shaft 9 extending from the housing 8 may be connected with any suitable source of power for driving the machine. A short vertical shaft 10a is provided extending through the housing 7 and to which the worm gear is secured. As shown in Figs. 1 and 2 a pair of channel iron members 11 are secured to the frame members 6 and a bearing 12 is secured to the members 11 and provide a bearing for the upper end of the shaft 10.

A flexible coupling 13 is also provided between the shafts 10 and 10a above the bearing 12. As shown in Fig. 3 a pair of parallel cross frame members 14 are provided in the rectangular frame 4 and a pair of cross brackets 15 are secured thereacross to which a lower bearing 16 for the shaft is secured as shown in Fig. 2 and a thrust bearing 17 is provided for the shaft 10 immediately above the bearing 16. A semi-spherical drum 18 is provided as shown in Fig. 2 and is secured to a bracket 19 which in turn is secured to a shaft 10. A similar drum 20 is secured to a bracket 21 which in turn is secured to the shaft 10 and a spacing sleeve 22 is positioned about the shaft 10 between the bracket 21 and the drum 18. The drum 18 is provided with a circular flange 23 welded thereto and a second circular flange 24 is secured to the lower edge thereof and this double flange is supported by brackets 25 secured to the drum 18. This double flange rides on a series of rollers 26 rotatably mounted in brackets 27 and these brackets are mounted on an annular base 28 shown more particularly in Fig. 3. In order to support the base 28 a series of corner braces 29 are provided in the lower rectangular frame 4 on which the annular base is secured and this base is also supported at the opposite ends of the cross frame members 14. A pair of braces 30 are provided on opposite sides of the frame 4 and connect the corner braces 29 to provide a support for the base 28 between the corner braces as will be understood from Figs. 2 and 3.

Figures 4, 5:
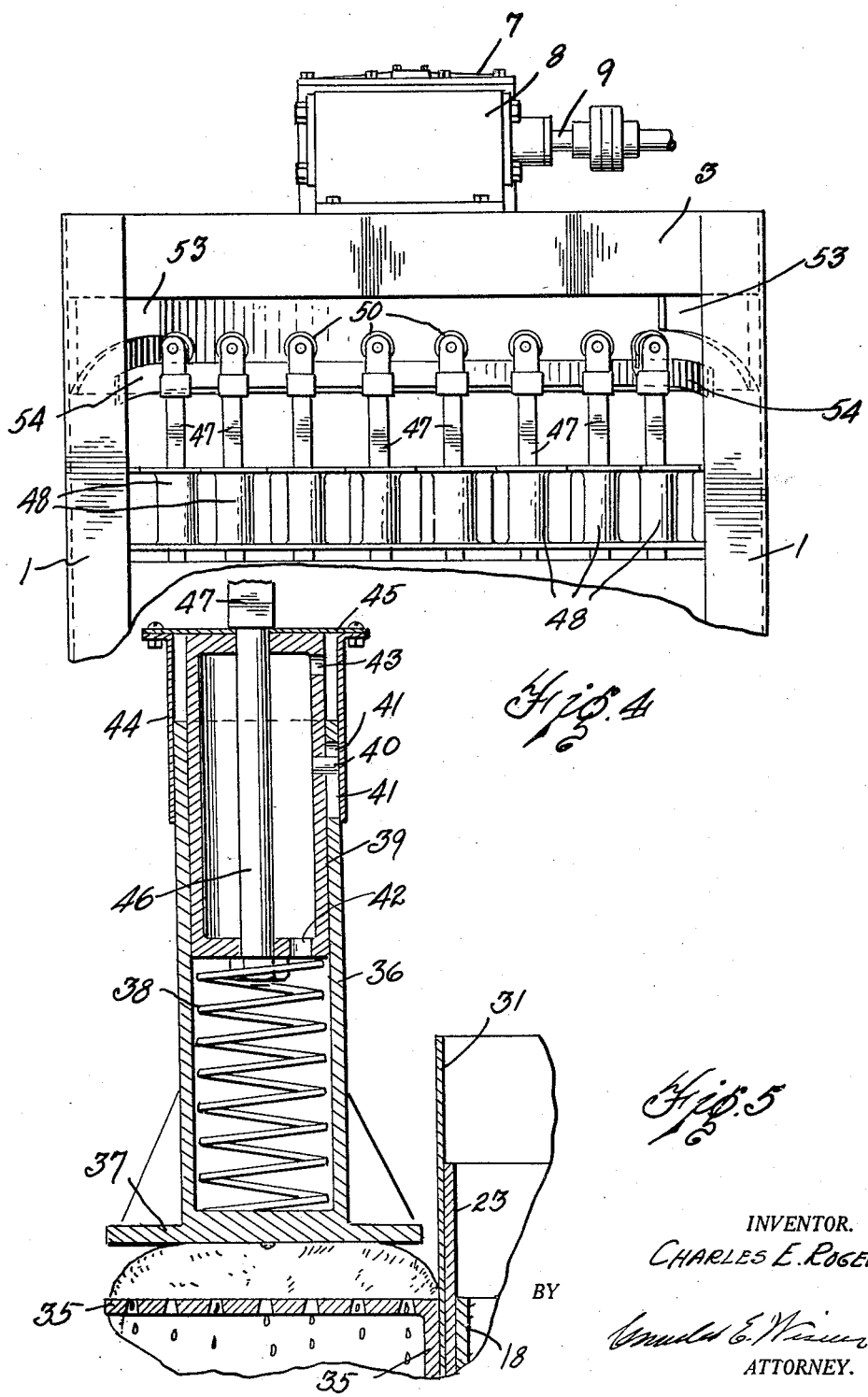
Fig. 4 is an elevation of the upper end of the machine.
Fig. 5 is a enlarged vertical section through one of the presses.

As shown in Fig. 2 an outer circular flange 31 is secured to the outside of a flange 23 and is provided with an outturned lower edge 32 extending over the inner edge 33 of a stationary tank or trough 34. As will be understood from Figs. 1 and 2 a series of thirty brackets 35 are secured to the flanges 31 and 23 and these brackets are each perforated as shown in Fig. 5 to allow the juice of the citrous fruits to be pressed therethrough. It will be noted that these perforations are of greater diameter at the bottom than at the top so that any seeds that are pressed into the perforations will not lodge therein and close them. As will be noted from Fig. 1 these brackets are positioned close together so as to form a nearly complete surface. The movable part of each press, as shown in Fig. 5, comprises a cylinder 36 having an enlarged foot 37 in the lower end thereof. A stiff coiled spring 38 is positioned in the hollow cylinder 36 and a piston 39 is positioned in the cylinder and rests on the spring 38. This piston is provided with an extending pin 40 riding in the slot 41 in the cylinder wall and the spring 38 normally holds the piston in position with the pin 40 engaging against the upper end of the slot 41. The piston 39 is hollow and air ports 42 and 43 are provided in the piston through which air may escape when the piston is forced down into the cylinder. A protecting cover is provided for the cylinder and piston comprising a slidable sleeve 44 which is slidable on the exterior of the cylinder and a plate 45 to which the sleeve is secured.

The piston 39 is apertured to receive the round end 46 of the press shaft and the plate 45 is bindingly secured between the piston and the shoulder between the round portion 46 of the shaft and the square portion 47 thereabove. The square portion 47 of each press shaft extends upwardly through a bracket 48 shown in Fig. 2 having a square guide opening therein for the shaft and the upper end of the press shaft carries a support 49 on which the rollers 50 and 51 are rotatably mounted. The brackets 48, shown in Figs. 2 and 4, are secured to a flange 52 which in turn is secured to the drum 20 which rotates with the shaft 10 to which it is secured. The roller 50 rides in contact with the under side of the semi-circular cam 53 which, as shown in Fig. 1, extends through about three-fourths of a complete circle. This is known as the pressure cam and is arranged to place a direct downward pressure on the movable parts of each press. Between the ends of the cam 53, as shown in Figs. 1 and 4, a lifting cam 54 is provided which engages beneath the rollers 51 and tends to lift these rollers and presses during a portion of the travel of the presses to allow removal of pulp and skins and allow fresh fruit to be fed onto the press base or brackets 35. These cams 53 and 54 are stationary while the presses travel around with the shaft 10 and drums 18 and 20 thereon.

The citrous fruits are cut in halves and are fed into the machine by a belt conveyor to a chute or guide 55 shown in Figs. 1 and 2, and the halves of the fruit are fed in succession onto the brackets 35 as will be understood from the right of Fig. 2. As the fruit is fed onto the brackets the rollers 50 are moved downwardly to put a pressure on the fruit halves. The first action of the press, as will be understood from Fig. 5, is to compress the spring 38 as the foot 37 of the cylinder comes into contact with the fruit. However, this spring is quite stiff and as the pistons are moved downwardly in the cylinders by the cam 53 a very strong pressure is applied to the fruit halves and is maintained throughout the low portion of the cam 53. Just before the pressure is released as will be understood from Fig. 2 only the skin and a little of the pulp remains on the brackets 35. By maintaining a pressure on the fruit throughout a considerable portion of the travel of the presses, sufficient time is allowed for all of the juice to be expressed from the fruit before the pressure is released. The pulp is removed from the brackets prior to their returning to position to receive new material from the feed chute or guide 55.

During the pressing operation some of the seeds and pulp of the fruit will fall into the bottom of the trough 34 and for this reason I have provided a spring arm 56 having a leather or rubber wiper 57 on the lower end thereof adapted to pass over the bottom of the trough. It is only necessary to provide one or two of these wipers and the pulp and seeds will be pushed around the trough in front of the wiper from which position they may be readily removed by hand. An outlet 58 is provided in the bottom of the trough 34 and this outlet may be connected to a storage tank or other suitable receptacle. With this device sufficient pressure is placed on the fruit so that a small quantity of the oil in the skins of the fruit is expressed therefrom thus giving an added flavor to the fruit juice. It will also be noted that by positioning the fruit halves on the brackets as shown in Fig. 5 the juice will not squirt out when pressure is applied but will pass downwardly through the perforations of the brackets into the trough 34.

From the foregoing description it becomes evident that the device is very simple and efficient in operation, will not easily get out of order, will express the juice from the individual fruit halves and provides a device which accomplishes the objects described.

Having thus fully described my invention, its utility and mode of operation, what I claim and desire to secure by Letters Patent of the United States is—

1. In a machine for extracting juice from citrous fruits, a frame, a vertical shaft rotatably mounted in the frame, means for rotating the shaft, a pair of drums secured to the shaft in spaced relation and rotatable therewith, a series of guide brackets secured in uniformly spaced relation to the periphery of the upper drum, a series of presses each secured to and having a shaft extending through the respective guide bracket, the lower end of each shaft being provided with a piston, a cylinder supported by the shaft and piston and in which the piston is reciprocable, each cylinder being provided with a foot at the lower end thereof, the lower face of which is an unbroken plane surface at a right angle to the axis of revolution, a spring in each cylinder between the piston and the end of the cylinder, means limiting movement of the piston in relation to the cylinder, a series of brackets of an inverted L shape the horizontal leg consisting of a perforate plate having a plane upper face secured to the periphery of the lower drum in vertical alignment with the guide brackets of the upper drum and each being positioned beneath the foot of a press, means by which unpressed fruit is positioned on the perforate brackets in succession, means for raising and lowering the presses during rotative movement of the drums, a stationary trough beneath the presses, the inner wall of which above the trough bottom is secured to the lower drum and rotatable therewith and includes a flange extending outwardly and downwardly over the said bottom of the stationary portion, an outlet for the trough and a scraper adapted to travel with the drums and extending into the bottom of the trough.

2. In a machine for extracting juice from citrous fruits, a frame, a vertical shaft rotatably mounted in the frame, means for rotating the shaft, a pair of drums secured to the shaft in spaced relation longitudinally thereof, a series of guide brackets secured to the periphery of the upper drum, a series of perforated brackets secured to the periphery of the lower drum, means for conveying unpressed fruit to the perforate brackets, a series of presses movable vertically through the guide brackets of the upper drum toward the perforated brackets of the lower drum, a cam secured to the frame, the presses being each provided with a roller at the upper end engaging the said cam, the said cam being arranged to move the presses downwardly in succession during rotation of the drum, a second cam adapted to lift the presses upwardly during a portion of rotation of the drum, each press consisting of a hollow cylinder having a presser foot at its lower end, a piston connected with the shaft and extending into the cylinder, a spring within the lower end of the cylinder engaged by the piston, said piston being hollow and having an aperture in its bottom end within the cylinder and an aperture at its upper end exteriorly of the cylinder, and means for supporting the cylinder on the piston and permitting movement of the cylinder relative to the piston.

In testimony whereof I sign this specification.

CHARLES E. ROGERS.